April 12, 1966  A. J. VAN NOORD  3,245,283
REMOTE CONTROL MIRROR
Filed June 4, 1963

INVENTOR.
Andrew J. VanNoord
BY
Dale A. Winnie
ATTORNEY

United States Patent Office 3,245,283
Patented Apr. 12, 1966

3,245,283
REMOTE CONTROL MIRROR
Andrew J. Van Noord, Grand Rapids, Mich., assignor to Kent Engineering Consultants, Grand Rapids, Mich., a partnership
Filed June 4, 1963, Ser. No. 285,436
1 Claim. (Cl. 74—501)

This invention relates to remote control rear view mirrors and more particularly to such mirror for use on trucks and like commercial vehicles.

There have been a greater number of different types of remote control rear view mirrors suggested for use on automotive vehicles. Most of these are cleverly devised, compact and extremely attractive mirrors which are however very expensive and impractical for use on trucks and other commercial vehicles where functionality, durability and ease of maintenance and repair is essential.

It is an object of this invention to provide a remote control rear view mirror which is inexpensive to manufacture, assemble and install.

It is also an object of this invention to provide a remote control rear view mirror which is highly functional and includes a very minimum of operative parts, simply arranged, shielded and protected in a manner assuring long serviceable life.

More specifically, it is an object of this invention to provide a vertically elongated mirror which requires adjustment only about a vertical axis and to provide such means of adjustment by simple cable control means operatively connected thereto.

It is an object of this invention to provide a control cable housing for use at the mirror and which is formed of simple stamped parts adapted to include many advantageous features.

It is an object of this invention to provide a combination control cable housing and mirror support which is simple in design, small in size and functional in use.

It is a further object of this invention, more incidental than direct, to teach means for readily adapting present trucks and commercial vehicle mirrors for remote control operation. Although not specifically shown nor described in the following discussion, it will be appreciated that the mirrors on fixed mountings are in present use and that ready adaptation to remote control use thereof is within the teachings set forth hereinafter.

These and other objects and advantages to be gained in the practice of this invention will be better understood and appreciated upon a reading of the following specification in regard to a preferred embodiment of the invention and having reference to the accompanying drawings wherein.

Figure 1:
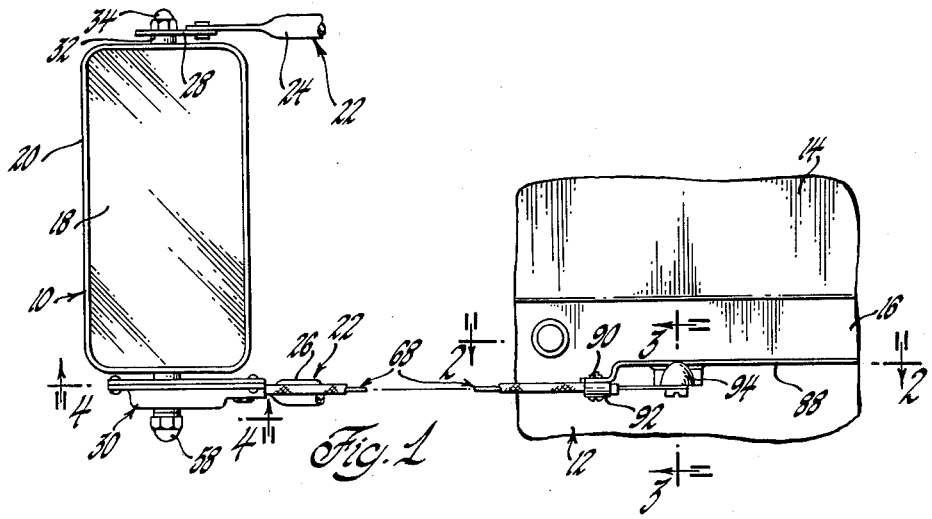
FIGURE 1 is a side and break-away view of a mirror and vehicle cab installation of the present invention.
Figure 2:
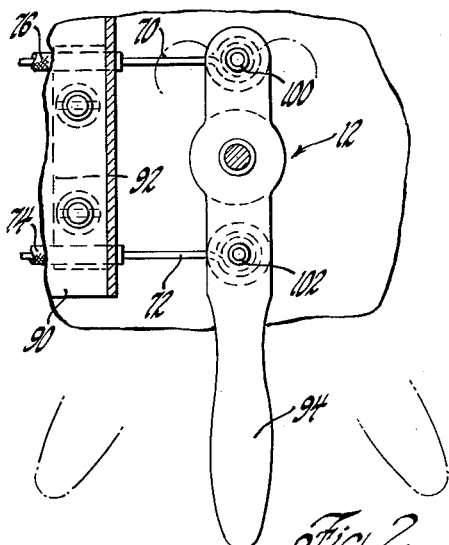
FIGURE 2 is an enlarged plan view of the control mechanism such as would be provided in a vehicle cab and as seen in the plane of line 2—2 of FIGURE 1.
Figure 3:
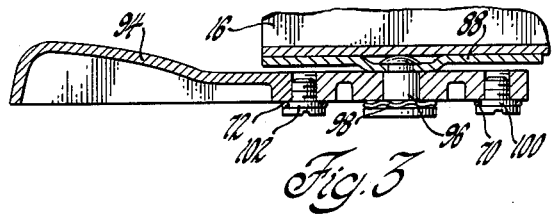
FIGURE 3 is a cross-sectional view of the control handle of FIGURE 2, as seen in the plane of line 3—3 and looking in the direction of the arrows thereon.
Figure 4:
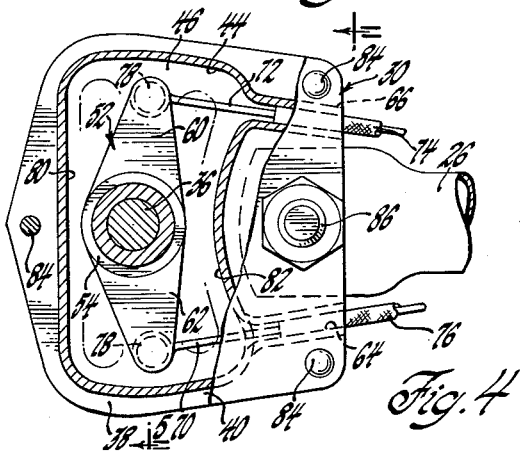
FIGURE 4 is an enlarged bottom plan view, with a cut away section, of the support and control housing as seen in the plane of line 4—4 of FIGURE 1 and looking in the direction of the arrows thereon.

The remote control rear view mirror 10 is shown as disposed when mounted on the side of a vehicle cab, as on the door post, and with the controls 12 disposed in the vehicle cab 14 under the instrument panel 16 or the like.

The mirror 10 includes a silver-backed or other form of mirror 18 in a case 20. It is a vertically elongated mirror and accordingly requires no adjustment about a horizontal axis to accommodate different users or to see up or down in being used to look backwards.

The mirror case 20 is retained within a trunnion support 22 provided by a pair of horizontally disposed and vertically spaced arms 24 and 26. These are tubular members flattened at their ends for pivotal engagement with the ends of the mirror case and include suitable brackets at the other ends (not shown) for attachment to the door post or side wall of the vehicle cab, as previously mentioned. The upper disposed arm 24 is shown engaged to a connecting link 28 at the top of the mirror case and the lower disposed arm 26 is shown engaged to the mirror support housing 30.

Figure 5:
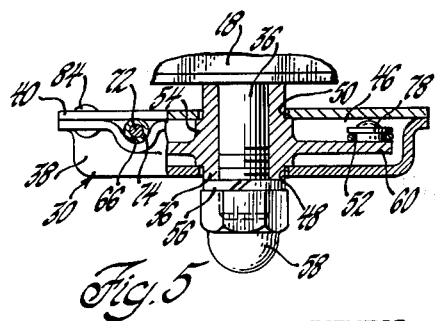
FIGURE 5 is a cross-sectional and partial end view of the support housing of FIGURE 4 as seen in the plane of line 5—5 and looking in the direction of the arrows thereon.

It will be appreciated that a pintle or pivot pin is provided at the upper end of the mirror case 20 and is engaged by the connecting bracket 28 of the arm 24 in a receptive bushing. The spacer 32 and nut 34 on the end of the pin preclude specific identification of the pin and bushing but this should be readily understood. In like manner, a pivot pin 36 is provided on the bottom end of the mirror case and is received through the support housing 30, as best seen in FIGURE 5.

The two pivot pins are axially aligned and provide a vertical axis for rotation or oscillation of the mirror to the right or left as mounted on the trunnion support 22.

The support housing 30 is formed by a pair of simple stampings 38 and 40. The one stamping 38 is formed to include a dished area or pocket 44 and the other stamping 40 is received as a cover thereover. This forms a chamber area 46 within the housing 30.

A pair of holes 48 and 50 are formed through the housing parts 38 and 40. These are aligned and disposed to receive the pivot pin 36 on the bottom end of the mirror case centrally through the chamber area 46.

A bell crank form of cross-arm member 52 is provided in the chamber area 46 and is secured to the pivot pin 36 on the mirror case. The cross arm member 52 includes a hub 54 through which the pivot pin 36 extends and which has its ends formed small enough to pass through the holes 48 and 50 in the housing parts. A lock washer 56 and cap nut 58 are received on the end of the pin 36, threaded for such purpose, to hold the cross arm member securely on the pin and for rotation therewith, and vice versa.

The hub portion 54 of the cross arm member is larger at its midsection and such as will not pass through the holes in the housing parts. Accordingly, the cross-arm member is retained in the support housing 30 and the arms 60 and 62 thereof are held spaced between the chamber forming walls.

The housing part 38 is formed to include a pair of passageways 64 and 66 through which control cable means 68 are extended. The control cable means include laterally flexible cables or wires 70 and 72 within protective sheaths 74 and 76. The control cables are connected to the cross-arms 60 and 62 by suitable fasteners 78 and the sheaths 74 and 76 are retained in the passageways 64 and 66 when the housing parts 38 and 40 are secured together.

It will be appreciated that the end walls 80 and 82 of the chamber area 46 are formed to accommodate the oscillation of the cross-arm member 52 and also serve as limit stops therefor.

The housing parts 38 and 40 are secured together by rivet fasteners 84 after the cross-arm member 52 is disposed therein and the control cable means 68 are engaged therewith. The final assembly is then secured by a bolt fastener 86 to the supporting arm 26 which is received between the cable passageways 64 and 66.

The cable passageways 64 and 66 will be noted as converging towards the supporting arm 26. This is to enable the respective cables to lie closely adjacent thereto or, if desired, to be threaded through the arm where further protection is desirable.

The controls 12 in the vehicle cab 14 are relatively simple. A mounting bracket 88 is secured to the underside of the instrument panel 16, or elsewhere, and includes a stepped end 90 with a cable guide and sheath retaining member 92 fastened thereto. A handle 94 is pivotally mounted on the underside of the mounting bracket 90 on a pin 96 with a spring washer 98 to retain it in any given position.

The control handle 94 extends beyond its pivotal connection to the mounting bracket 90 and is formed to receive threaded fasteners 100 and 102 on opposite sides thereof to secure the control cables 70 and 72 thereto.

Pivotal movement of the handle 94 to the right or left will draw one or the other of the control cables 70 and 72 through their respective sheaths and pull the cross-arm member 52 in like manner. The mirror case 20, being rotatable with the cross-arm member 52, is turned in or out and the mirror 18 is accordingly set in any manner desired.

As previously mentioned, the support housing 30 and control unit 12 may be provided as a sub-assembly for modification of existing manually adjustable outside rear view mirrors, as used on trucks and commercial vehicles. The connecting link 28 at the top of the mirror and the housing 30 need merely be interposed between the ends of existing support arms such as 24 and 26 and the mirror in present use.

Although a preferred embodiment of this invention has been shown and described in detail, it will be appreciated that certain modifications and improvements are within the scope of the teachings set forth. Accordingly, such of these improvements and modifications as are within the spirit of the invention and are not specifically excluded by the language of the hereinafter appended claim, are to be considered as inclusive thereunder.

I claim:

A remote control rear view mirror, comprising:

a vertically elongated mirror, trunnion support means provided at opposite ends of said mirror for supporting said mirror for oscillation about a vertical axis, the lower disposed of said trunnion support means including a two part housing having one part thereof formed to include a chamber area and the other part thereof provided as an enclosing cover thereover, a pivot pin provided on the lower end of said mirror and received through said housing, a cross arm member provided on said pivot pin and disposed in the chamber area of said housing, said chamber area having the side walls thereof disposed to provide limit stops restrictive of the oscillation of said cross arm member in opposite directions and accordingly said mirror, control cable means having protective sheaths, said cable means extending into said chamber area and being engaged to opposite ends of said cross arm member and said sheaths being received and retained between said housing parts for cable guiding use, and a remotely disposed pivotally mounted control member having said control cables operatively connected thereto.

References Cited by the Examiner
UNITED STATES PATENTS

| | | | |
|---|---|---|---|
| 149,211 | 3/1874 | Foot et al. | 74—501 |
| 1,367,318 | 2/1921 | Horton | 74—487 X |
| 2,326,316 | 8/1943 | Allen | 88—98 X |
| 2,436,678 | 2/1948 | Somers | 248—284 X |
| 2,620,708 | 12/1952 | Anderson | 88—93 |
| 2,843,018 | 7/1958 | Cooper et al. | 88—93 X |
| 2,897,726 | 8/1959 | Clark | 88—93 |

BROUGHTON G. DURHAM, *Primary Examiner.*